A. J. JACOBY.
REMOVABLE BUTTON.
APPLICATION FILED NOV. 12, 1918.

1,318,082.

Patented Oct. 7, 1919.

INVENTOR
Alfred J. Jacoby.
BY
Fred G. Dieterich
ATTORNEY

UNITED STATES PATENT OFFICE.

ALFRED J. JACOBY, OF VANCOUVER, BRITISH COLUMBIA, CANADA.

REMOVABLE BUTTON.

1,318,082.　　　　　Specification of Letters Patent.　　Patented Oct. 7, 1919.

Application filed November 12, 1918. Serial No. 262,155.

*To all whom it may concern:*

Be it known that I, ALFRED J. JACOBY, a citizen of the United States, residing at Vancouver, in the Province of British Columbia, Canada, have invented certain new and useful Improvements in Removable Buttons, of which the following is a specification.

This invention relates to a removable button of that class used as a rank badge or as a distinguishing mark for club or associate membership.

The object of the invention has been to provide a fastening for such a button, that has a screw thread connection between the display portion of the button and the back washer of the same; the thread engaging portion being formed on the back washer and split that it may spring over the threads of the screwed stem by direct endwise applied pressure.

The usual screw thread connection between the display portion of such a button and the retaining back washer is open to objection in the time it takes to apply the nut to the screw. This loss of time is not material in use where only one or two are required, but where a large number are applied at one time, as in "carding" the buttons at the place of manufacture, the application of the nuts to the screws consumes a considerable amount of time.

This passage of the thread engaging back washer onto the stem is facilitated by forming the screw thread with an inclined face toward the end and an abutment face to oppose backward movement.

The invention is particularly described in the following specification, reference being made to the drawings by which it is accompanied, in which.

Figure 5:
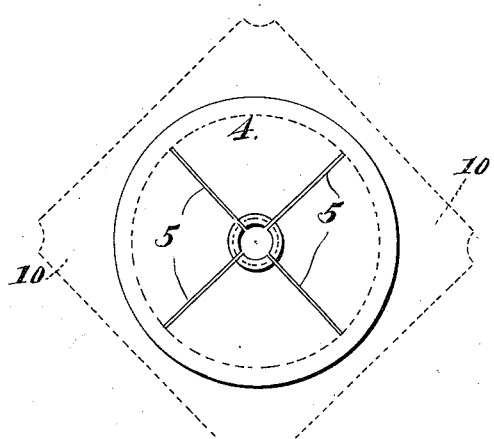
Figure 6:
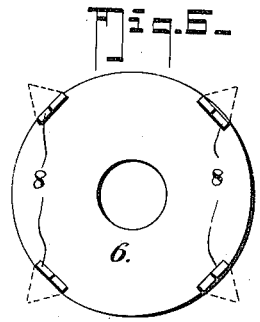

Figs. 5 and 6, a face view of the washer and split nut and of the loose washer, respectively.

Figure 1:
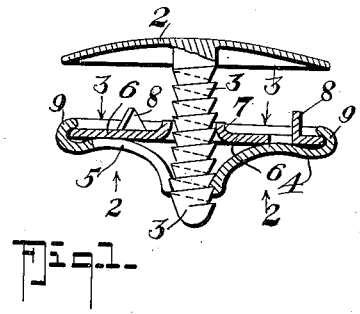
Figure 1 is a vertical section through the button and its fastening on the line 1—1 in Figs. 2 and 3.
Figure 2:
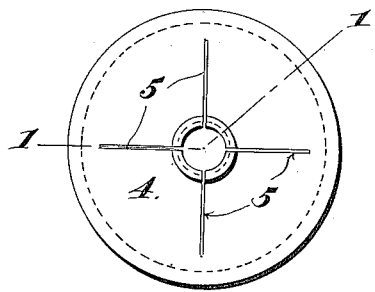
Fig. 2 is a face view of the split nut fastening looking in the direction of the arrows 2 in Fig. 1.
Figure 3:
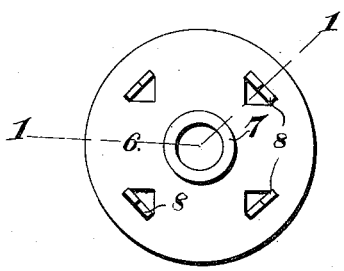
Fig. 3 is a face view of the loose cloth engaging washer looking in the direction of the arrows 3 in Fig. 1.

In these drawings 2 represents the display portion of the button or badge, to the center of which is soldered or otherwise secured a central stem 3 which is screw threaded to receive the nut of the back or retaining washer 4. The thread engaging central portion of this back washer 4 is turned outward somewhat as shown in Fig. 1 and is radially split as at 5, to afford a measure of free flexibility that will permit the thread engaging ends to pass endwise over the thread but that will prevent backward movement over the same.

The edge 9 of this washer 4 is lightly beaded over the edge of a supporting washer 6 in a manner permitting free rotation of 6 on 4, and this washer 6 is centrally apertured and inwardly flanged at 7 to pass freely over the tops of the thread without engagement therewith, and affords support to the washer 4 against canting on the stem which the radially split nut would be liable to do without such support.

This washer 6 has projections 8 which are stamped and turned inward toward the back of the display portion 2 of the button to engage and press the cloth thereagainst and prevent rotation of the button on the cloth.

To further facilitate passage of the split thread engaging aperture of the washer 4 over the thread of the stem the thread is preferably of the abutment class as shown in the drawing with an angular slope turned toward the outer end of the stem 3 and a square abutment face toward the display button.

The compound back washer 4, 6 can thus be readily passed on the stem 3 and if necessary can thereafter be tightened on the cloth by rotation of the washer 4 on the stem, and the abutment face of the thread and the outwardly turned thread engagement will effectually prevent endwise movement outward.

Figure 4:
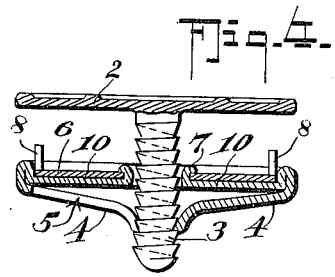
Fig. 4 shows a modification in vertical section.

In the modification shown in Figs. 4, 5 and 6 the thread engaging portion 4 of the washer is integral with a supporting portion 10, which is apertured to pass freely onto the stem 3; the resilient thread engaging portions being turned inward toward the center from a blank somewhat as indicated by the dot and dash lines in Fig. 5. In this construction the loose washer 6 with its cloth engaging points 8 is rotatably mounted on the central stem support 7.

I am aware that prior to my invention a screw connection has been used between the display portion of the button and the washer by which it is retained in place, wherein the thread engaging portion has been split to spring over the threads, but in such the threaded stem has been secured to the back washer, and the thread engagement to the display portion of the button.

This is open to objection in that the display portion must be large enough to accommodate the free end of the stem: A condition which is not suitable for rank badges or association buttons of this class, the size of which must be kept within reasonable limits.

Further, in the device, which is the subject of this application, the screwed stems and retaining washers with the resilient thread engaging attachment may be manufactured in large quantities by special machinery and furnished to local jewelers and jobbers, and can by them be applied to relatively limited numbers of the display portions 2 by merely soldering the stems 3 to them.

Having now particularly described my invention, I hereby declare that what I claim as new and desire to be protected in by Letters Patent, is:—

1. A removable button, comprising the combination with the display portion of the button, of a threaded stem secured to and backwardly projecting therefrom, a retaining washer centrally apertured and radially split to spring over the thread of the stem and be retained thereon against backward movement, and a supporting washer centrally apertured to pass over the thread of the stem without engagement with such thread, said supporting washer connected to the retaining washer between it and the display portion of the button the threads of said stem being of the abutment class having an angular slope turned toward the outer or point end of the stem and a squared abutment face toward the display portion of the button.

2. A removable button, comprising the combination with the display portion of the button, of a threaded stem secured to and backwardly projecting therefrom, a retaining washer centrally apertured and radially split to spring over the thread of the stem and be retained thereon against backward movement, a supporting washer centrally apertured to pass over the thread of the stem without engagement with such thread, said supporting washer connected with the retaining washer so as to be rotatable thereupon between the retaining washer and the display portion of the button and projections from the face of the supporting washer directed toward the display portion of the button, the threads of said stem being of the abutment class having an angular slope turned toward the outer or point end of the stem and a squared abutment face toward the display portion of the button.

3. A removable button, comprising the combination with the display portion of the button, of a threaded stem secured to and backwardly projecting therefrom, a retaining washer centrally apertured to pass over the thread of the stem without engagement therewith, said washer having portions stamped and doubled over toward the center to enter into engagement with the thread of the stem, which thread engaging portion will spring over the thread inward but will resist movement backward.

4. A removable button, comprising the combination with the display portion of the button, of a threaded stem secured to and backwardly projecting from it, a retaining washer centrally apertured to pass over the thread of the stem without engagement therewith, said washer having portions doubled over outward from its outer edge toward the center and adapted to enter into resilient engagement with the thread of the stem to allow endwise movement toward the display portion of the button and prevent endwise movement outward on the stem, and a cloth engaging washer rotatably mounted on the central portion of the retaining washer, said washer having cloth engaging points inwardly turned from it.

In testimony whereof I affix my signature.

ALFRED J. JACOBY.